United States Patent
Kwak et al.

(10) Patent No.: US 11,707,963 B2
(45) Date of Patent: Jul. 25, 2023

(54) AIR CONDITIONER FOR VEHICLE

(71) Applicants: HYUNDAI MOTOR COMPANY, Seoul (KR); KIA MOTORS CORPORATION, Seoul (KR); DOOWON CLIMATE CONTROL CO., LTD., Asan-si (KR)

(72) Inventors: Jung Mo Kwak, Gunpo-si (KR); Myung Jun Kim, Busan (KR); Dong Won Yeon, Daejeon (KR); Chul Min Jang, Asan-si (KR)

(73) Assignees: HYUNDAI MOTOR COMPANY, Seoul (KR); KIA MOTORS CORPORATION, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 390 days.

(21) Appl. No.: 17/005,695

(22) Filed: Aug. 28, 2020

(65) Prior Publication Data
US 2021/0178852 A1    Jun. 17, 2021

(30) Foreign Application Priority Data
Dec. 13, 2019    (KR) ........................ 10-2019-0166476

(51) Int. Cl.
*B60H 1/00*    (2006.01)

(52) U.S. Cl.
CPC ..... *B60H 1/00064* (2013.01); *B60H 1/00514* (2013.01); *B60H 2001/002* (2013.01); *B60H 2001/00092* (2013.01); *B60H 2001/00114* (2013.01)

(58) Field of Classification Search
CPC ............ B60H 1/00064; B60H 1/00514; B60H 2001/00114; B60H 1/00021; B60H 1/00028; B60H 2001/00092; B60H 2001/002; B60H 1/00671; B60H 1/00835
See application file for complete search history.

(56) References Cited

U.S. PATENT DOCUMENTS

| 6,311,763 B1 * | 11/2001 | Uemura ................. B60H 1/247 62/244 |
| 6,640,890 B1 * | 11/2003 | Dage .................. B60H 1/00821 165/203 |
| 9,174,511 B2 * | 11/2015 | Seto ...................... B60H 1/3233 |
| 2001/0004015 A1 * | 6/2001 | Bendell ............. B60H 1/00064 165/203 |
| 2006/0175050 A1 * | 8/2006 | Kang ................. B60H 1/00064 165/203 |

FOREIGN PATENT DOCUMENTS

KR         20050120158 A    * 12/2005

* cited by examiner

*Primary Examiner* — Lionel Nouketcha
(74) *Attorney, Agent, or Firm* — Lempia Summerfield Katz LLC

(57) ABSTRACT

An air conditioner for a vehicle includes: a casing to accommodate a cooler and a heater; a front temp door disposed in the casing to control a temperature of air supplied to a front seat zone; a rear temp door disposed under the front temp door to control a temperature of air supplied to a rear seat zone; and a rear vent disposed at a lower portion of the casing to discharge air to the rear seat zone. The air conditioner can secure the flow rate of the air that is supplied to the rear seat zone of the interior of a vehicle by improving the route for flow of the air that is supplied to the rear seat zone.

12 Claims, 12 Drawing Sheets

AIR CONDITIONER FOR VEHICLE

CROSS REFERENCE TO RELATED APPLICATION

The present application claims priority to and the benefit of Korean Patent Application No. 10-2019-0166476, filed Dec. 13, 2019, the entire contents of which are incorporated herein by reference.

FIELD

The present disclosure relates to an air conditioner for a vehicle.

BACKGROUND

The statements in this section merely provide background information related to the present disclosure and may not constitute prior art.

In general, a vehicle is equipped with an air conditioner that can control temperature of the interior for heating/cooling. Such an air conditioner includes an evaporator and a condenser and controls the temperature of air that is supplied into a vehicle.

In the related art, air conditioners usually employ a single zone control type that controls the interior of a vehicle at the same temperature or a dual zone control type that separately controls the temperature of a front seat zone and a rear seat zone by dividing the interior of a vehicle.

FIG. 1 is a cross-sectional view showing an air conditioner of the related art and FIG. 2 is a view showing a flow path of air that is blown to rear seats through a heater.

As shown in FIG. 1, an air conditioner of the related art includes a casing 4 in which an evaporator 1, a condenser 2, and a heater 3 are disposed, and a front door 5 and a rear door 6 are installed on the casing 4. Air with controlled temperature in the casing 4 is discharged to a front seat zone in a vehicle when the front door 5 is opened, and is discharged to a rear seat zone in the vehicle when the rear door 6 is opened.

We have discovered that such an air conditioner of the related art has a limitation that single zone control and a dual zone control can be applied, but triple zone control that is being recently studied cannot be applied.

In addition, we have found that since the rear door 6 is disposed over the heater 3 and a temp door 7 in the air conditioner, the air heated by the heater 3 is guided through an open entrance by the temp door 7, is turned to an open inlet by the rear door 6, and is then discharged to a rear vent 8 (see the arrow in FIG. 2). A loss of flow rate is generated in the air discharged to the rear vent 8 due to the appropriate route described above, so there is a problem that the flow rate of air that is supplied to the rear seats is insufficient.

Further, the air conditioner has a separation wall 9 for discharging condensate water produced in the evaporator 1, so there is a problem that the separation wall 9 decreases the space for air to flow after passing through the evaporator 1.

SUMMARY

The present disclosure provides an air conditioner for a vehicle that can secure the flow rate of air that is supplied to a rear seat zone in a vehicle by improving the route for flow of air that is supplied to the rear seat zone.

An air conditioner for a vehicle according to an aspect of the present disclosure includes: a casing accommodating a cooler and a heater, where the cooler is configured to decrease a temperature of air discharged to an interior of a vehicle, and the heater is configured to increase the temperature of the air in the interior of the vehicle; a front temp door disposed in the casing and configured to control a temperature of air that is supplied to a front seat zone of the interior of the vehicle by controlling a flow rate of air flowing to the heater after passing through the cooler; a rear temp door disposed under the front temp door and configured to control a temperature of air that is supplied to a rear seat zone of the interior of the vehicle by controlling the flow rate of the air flowing to the heater after passing through the cooler; and a rear vent disposed at a lower portion of the casing under the cooler disposed ahead of the heater and configured to discharge air to the rear seat zone. The air conditioner has the following detailed characteristics.

In some forms of the present application, a rear door to open and close the rear vent may be disposed at a lower portion of the casing, and the rear door may be disposed under the cooler disposed ahead of the heater.

In one form, a front separation wall configured to inhibit or prevent the air that has passed through the cooler from flowing to the heater may be disposed between the cooler and the heater, and the front separation wall may have an inlet that is opened and closed by the rear temp door.

In another form, when the inlet of the front separation wall is opened by the rear temp door, the air that has passed through the cooler may flow to the heater through the inlet.

In other form, the rear temp door may inhibit or prevent the air that has passed through the cooler from flowing to the rear vent through a first channel disposed between a lower end of the cooler and a lower end of the heater by closing the first channel when the inlet of the front separation wall is opened.

In some forms of the present application, a second channel configured to guide air that has passed through the heater to the rear seat zone may be disposed under the heater, and the rear vent may be disposed at a downstream side of the first channel and the second channel.

In some forms of the present application, the front separation wall may be disposed ahead of the heater, a rear separation wall may be disposed behind the heater, and an upper portion of a heating space surrounded by the front separation wall and the rear separation wall may be opened and closed by a left front temp door and a right front temp door.

In some forms of the present application, the rear separation wall may have a baffle protruding toward the heater, and the baffle may guide air, which has passed through a lower portion of the heater after passing through an inlet of the front separation wall, to the second channel.

In some forms of the present application, a sub-rear temp door configured to inhibit or prevent air that has passed through the first channel from flowing backward to an upstream side of the second channel may be disposed in the second channel. In another form, the casing may have a condensate water collector disposed under the cooler, the condensate water collector may have a discharge port for discharging condensate water produced by the cooler, and a rear surface of the condensate water collector may bend upward behind the discharge port. The rear surface of the condensate water collector may be positioned under a lower end of the cooler.

In other form, a bottom surface of the casing disposed behind the condensate water collector and under the first channel may be inclined upward and rearward from a front.

In some forms of the present disclosure, a left outlet for discharging air to a left front seat zone and a left front door for opening and closing the left outlet may be disposed at an upper portion of a left casing part, and a flow rate of air that is blown to the left front seat zone may be controlled in accordance with the degree of opening of the left front door.

In some forms of the present disclosure, a right outlet for discharging air to a right front seat zone and a right front door for opening and closing the right outlet may be disposed at an upper portion of a right casing part, and a flow rate of air that is blown to the right front seat zone may be controlled in accordance with the degree of opening of the right front door.

In some forms of the present disclosure, the casing may be divided into a left casing part and a right casing part by a separator disposed at a center portion of the casing. In another form the front temp door may include: a left front temp door disposed in the left casing part and configured to control a temperature of air that is supplied to a left front seat zone of the interior of the vehicle by controlling a flow rate of the air flowing to the heater after passing through the cooler; and a right front temp door disposed in the right casing part and configured to control a temperature of air that is blown to a right front seat zone of the interior of the vehicle by controlling the flow rate of the air flowing to the heater after passing through the cooler.

According to the configuration described above, the air conditioner according to the present disclosure can achieve the following effects.

First, it is possible to increase the flow rate of air that is supplied to the rear seat zone in comparison to air conditioners of the related art by optimizing the flow path of the air that is discharged to the rear seat zone.

Second, it is possible to separately control temperature of the front zone and the rear zone by dividing the interior of the vehicle into the front zone and the rear zone.

Third, a blowing space for the air that has passed through the container is increased by reducing a separation wall structure for collecting and discharging condensate water, so the flow rate of air can be increased.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
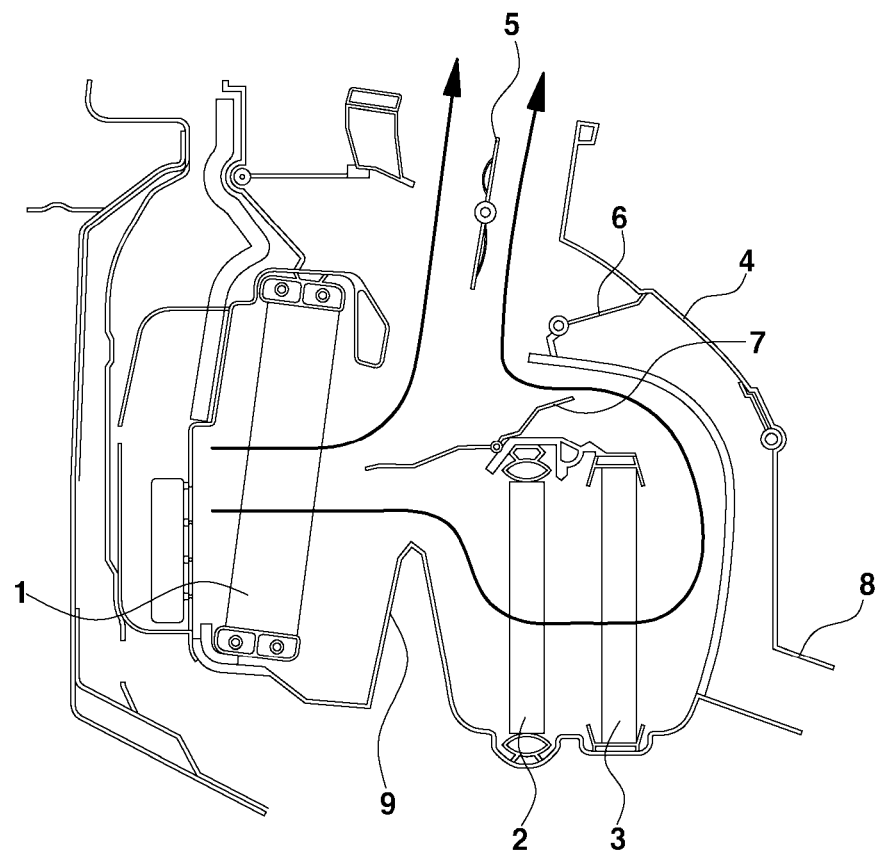
FIG. 1 is a view showing an air conditioner of the related art.
Figure 2:
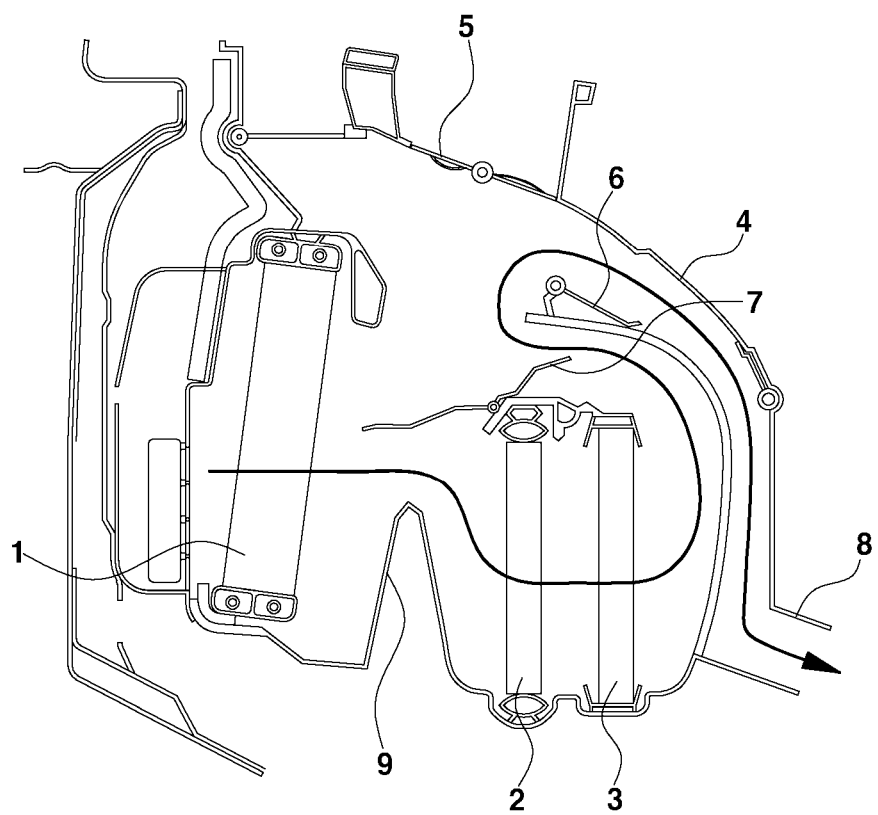
FIG. 2 is a view showing a flow path of air that is blown to a rear seat zone through a heater.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that directions such as 'left', 'right', 'up', and 'down' are defined on the basis of a vehicle equipped with an air conditioner.

An air conditioner of the present disclosure is configured to be able to secure a flow rate of air that is supplied to a rear seat zone of the interior of a vehicle by improving a route for flow of air that is supplied to the rear seat zone of the interior of the vehicle. Further, the air conditioner is configured to be able to separately control temperature for a front seat zone and a rear seat zone by dividing the interior of a vehicle and to separately control temperature for a left front seat zone, a right front seat zone, and a rear seat zone by dividing the interior of the vehicle.

The left front seat zone may be a driver seat zone and the right front seat zone may be a passenger seat zone.

Figure 3:
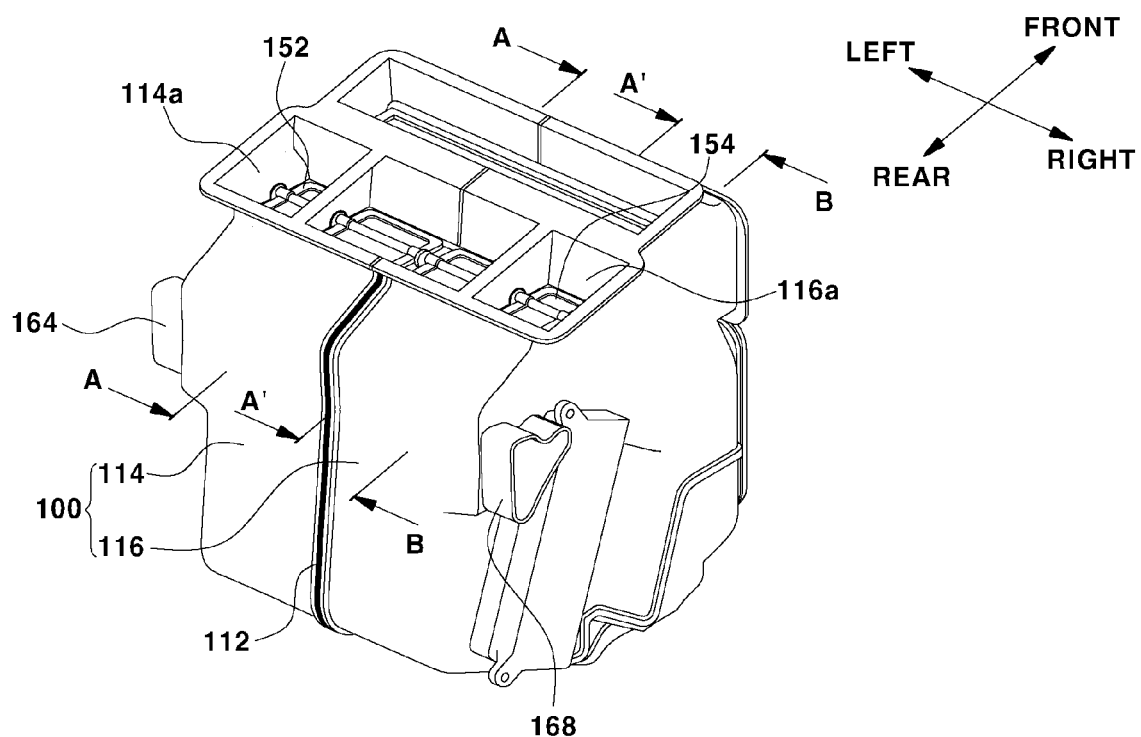
FIG. 3 is a perspective view showing an air conditioner according to one form of the present disclosure.
Figure 4A:
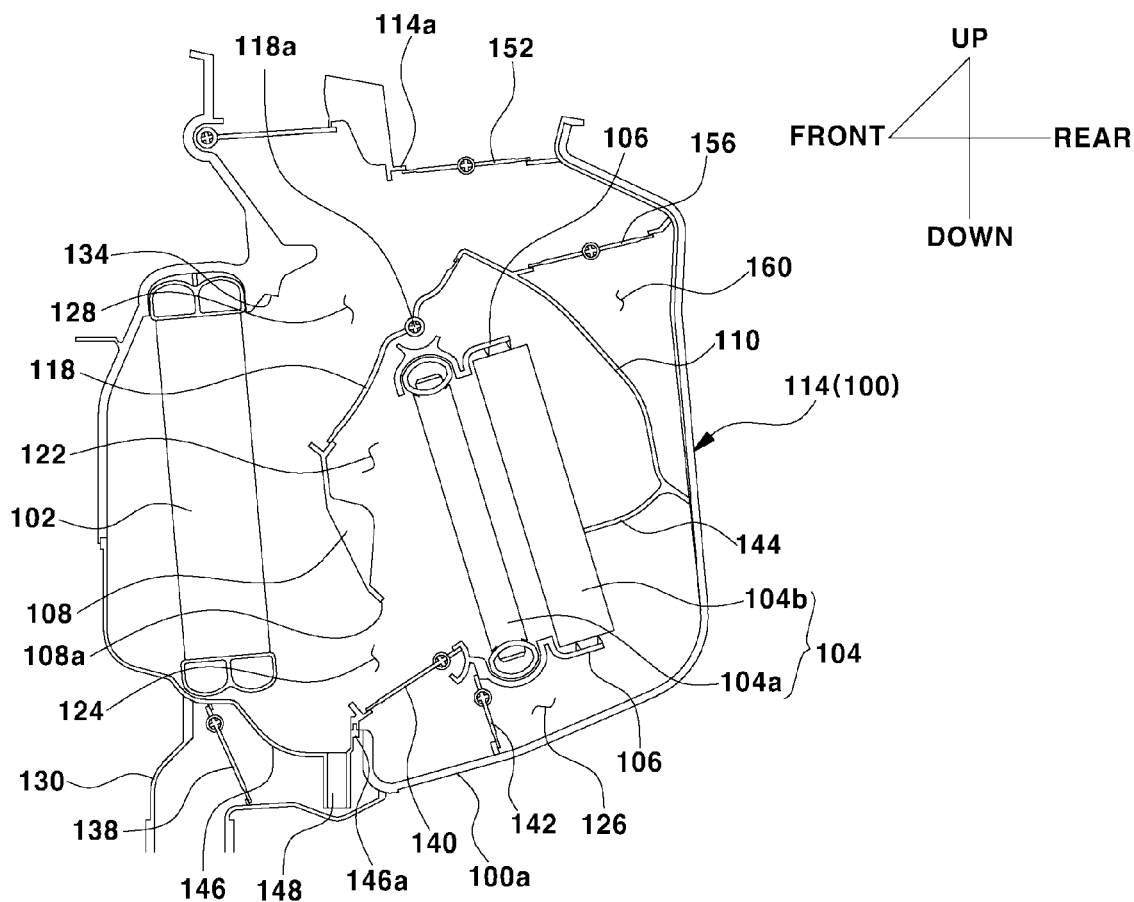
FIG. 4A is a cross-sectional view taken along line A-A shown in FIG. 3.
Figure 4B:
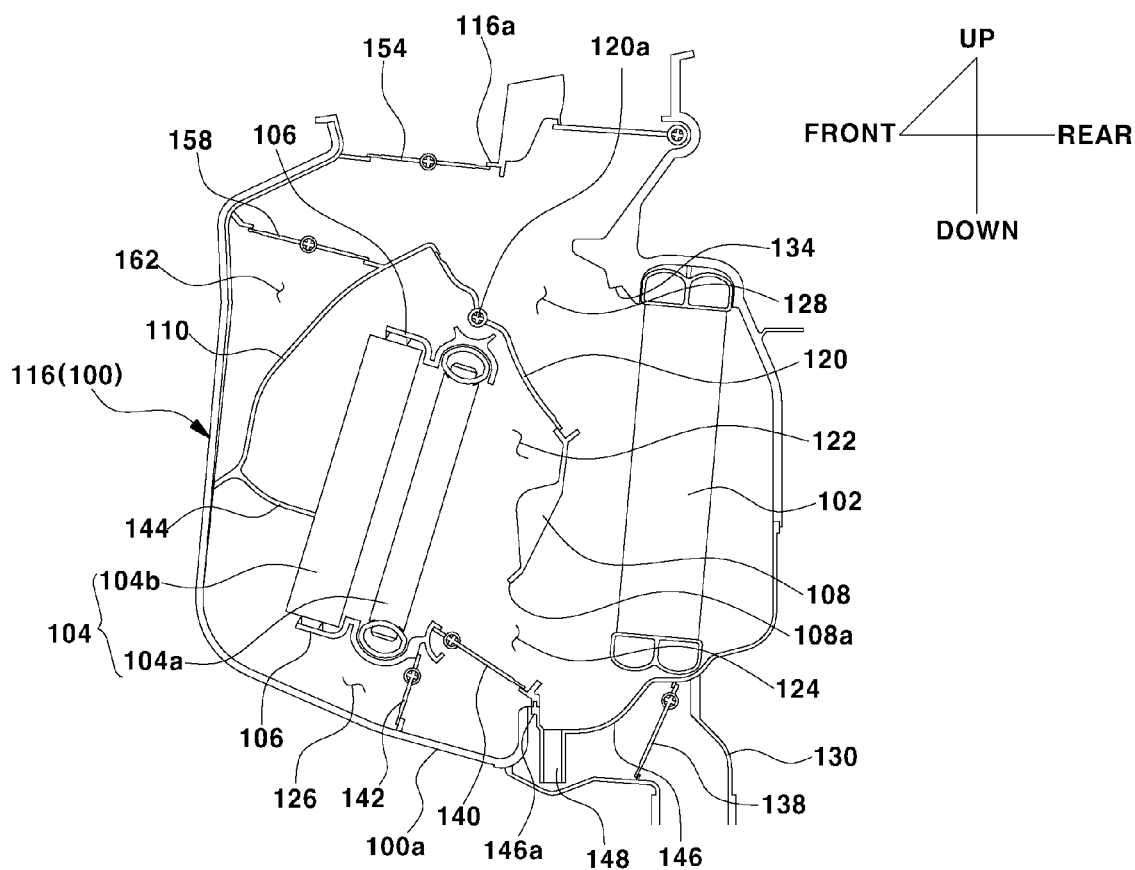
FIG. 4B is a cross-sectional view taken along line B-B shown in FIG. 3.
Figure 5:
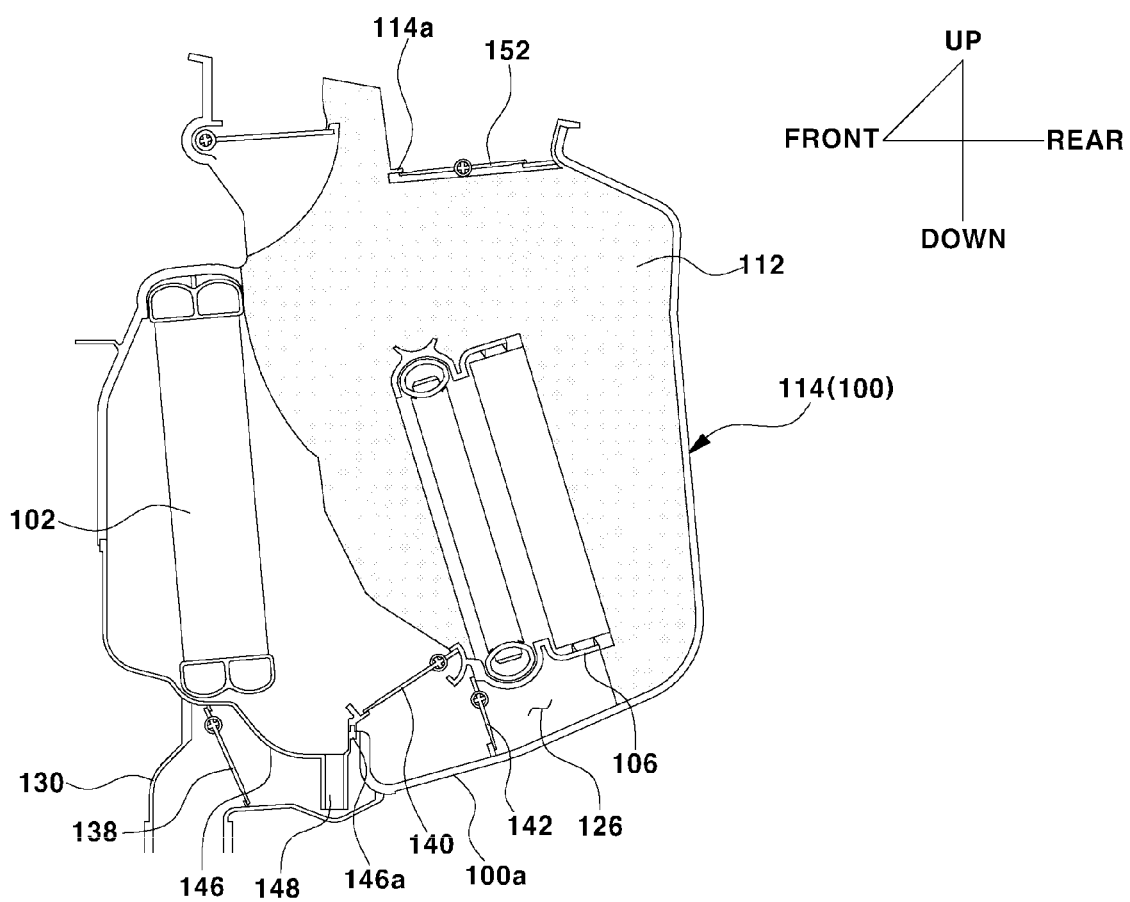
FIG. 5 is a cross-sectional view taken along line A'-A' shown in FIG. 3.

As shown in FIGS. 3 to 5, the air conditioner includes a casing 100 having an internal space, and a cooler 102 and a heater 104 disposed in the internal space of the casing 100.

Air that is blown by a blower can flow in the internal space of the casing 100. The air blown by the blower can be decreased in temperature by the cooler 102 and can be increased in temperature by the heater 104. The air can be discharged to the interior of the vehicle after passing through the cooler 102 or can be discharged to the interior after passing through the cooler 102 and the heater 104.

The cooler 102 may be an evaporator that can decrease the temperature of air through heat exchange using a refrigerant and the heater 104 may be composed of a condenser 104a that can increase the temperature of air through heat exchange using a refrigerant and a PTC heater 104b that can heat air by receiving power.

The cooler 102 may be disposed in the front space of the internal space of the casing 100 and the heater 104 may be disposed in the rear space of the internal space of the casing 100. That is, the cooler 102 may be disposed at a predetermined distance ahead of the heater 104. The cooler 102 may be installed to be fixed in the front space of the casing 100. The heater 104 may be installed to be fixed in the rear space of the casing 100 and a mount 106 to which the heater 104 is mounted and fixed may be disposed in the rear space of the casing 100. The heater 104 may be disposed in a space (i.e., a heating space) surrounded by a front separation wall 108 and a rear separation wall 110 disposed in the rear space of the casing 100 when it is mounted on the mount 106.

Referring to FIGS. 3 and 5, the casing 100 may be divided into two parts, a left casing part 114 and a right casing part 116, by a separator 112 therebetween.

The separator 112 is disposed at the center portion in a left-right direction in the casing 100, thereby being able to divide the rear space of the internal space of the casing 100 into two left and right parts. Accordingly, the left casing part 114 surrounds the left space in the internal space of the casing 100 and the right casing part 116 surrounds the right space in the internal space of the casing 100. The left casing part 114 may be disposed ahead of the left front seat zone and the right casing part 116 may be disposed ahead of the right front seat zone.

The cooler 102 may be disposed throughout the internal space of the left casing part 114 and the internal space of the right casing part 116. The heater 104 may also be disposed throughout the internal space of the left casing part 114 and the internal space of the right casing part 116.

FIG. 4A is a cross-sectional view taken along line A-A shown in FIG. 3 and FIG. 4B is a cross-sectional view taken along line B-B shown in FIG. 3. Referring to FIG. 4A, a left front temp door 118 is disposed in the left casing part 114. Further, referring to FIG. 4B, a right front temp door 120 is disposed in the right casing part 116.

The left front temp door 118 can be mounted to be rotatable about a hinge 118a in the casing 100. The hinge 118a is fixed to the separator 112 and the left casing part 114, thereby being able to support rotation of the left front temp door 118. That is, the left front temp door 118 can be rotatably supported by the separator 112 and the left casing part 114. The left front temp door 118 can come in contact with the upper end of the front separation wall 108 and the upper end of the rear separation wall 110 when the degree of opening is 0 (zero). In other words, when the left front temp door 118 is operated in a closed mode, the front end and the rear end of the left front temp door 118 can come in contact with the upper end of the front separation wall 108 and the upper end of the rear separation wall 110.

The right front temp door 120 can be mounted to be rotatable about a hinge 120a in the casing 100. That is, the right front temp door 120 can be rotatably supported by the separator 112 and the right casing part 116. The right front temp door 120 can come in contact with the upper end of the front separation wall 108 and the upper end of the rear separation wall 110 when the degree of opening is 0 (zero). That is, when the right front temp door 120 is operated in a closed mode, the front end and the rear end of the right front temp door 120 can come in contact with the upper end of the front separation wall 108 and the upper end of the rear separation wall 110.

The front separation wall 108 may be disposed ahead of the heater 104 in the casing 100 and the rear separation wall 110 may be disposed behind the heater 104. The front separation wall 108 and the rear separation wall 110 can form a heating space 122 by surrounding the heater 104 together with the left front temp door 118, the right front temp door 120, and the mount 106. Accordingly, the upper portion of the heating space 122 can be opened/closed by the left front temp door 118 and the right front temp door 120. Further, a channel is formed between the rear separation wall 110 and the lower portion of the mount 106, so the heating space 122 can communicate with a second channel 126. That is, the heating space 122 can be open such that the lower portion thereof can be connected with the second channel 126. The second channel 126 is disposed at the lower portion of the casing 100, it can guide air increased in temperature by the heater 104 to the rear vent 130. The second channel 126 may extend under a first channel 124. The rear vent 130 may be connected to the downstream sides of the first channel 124 and the second channel 126.

Figure 6:
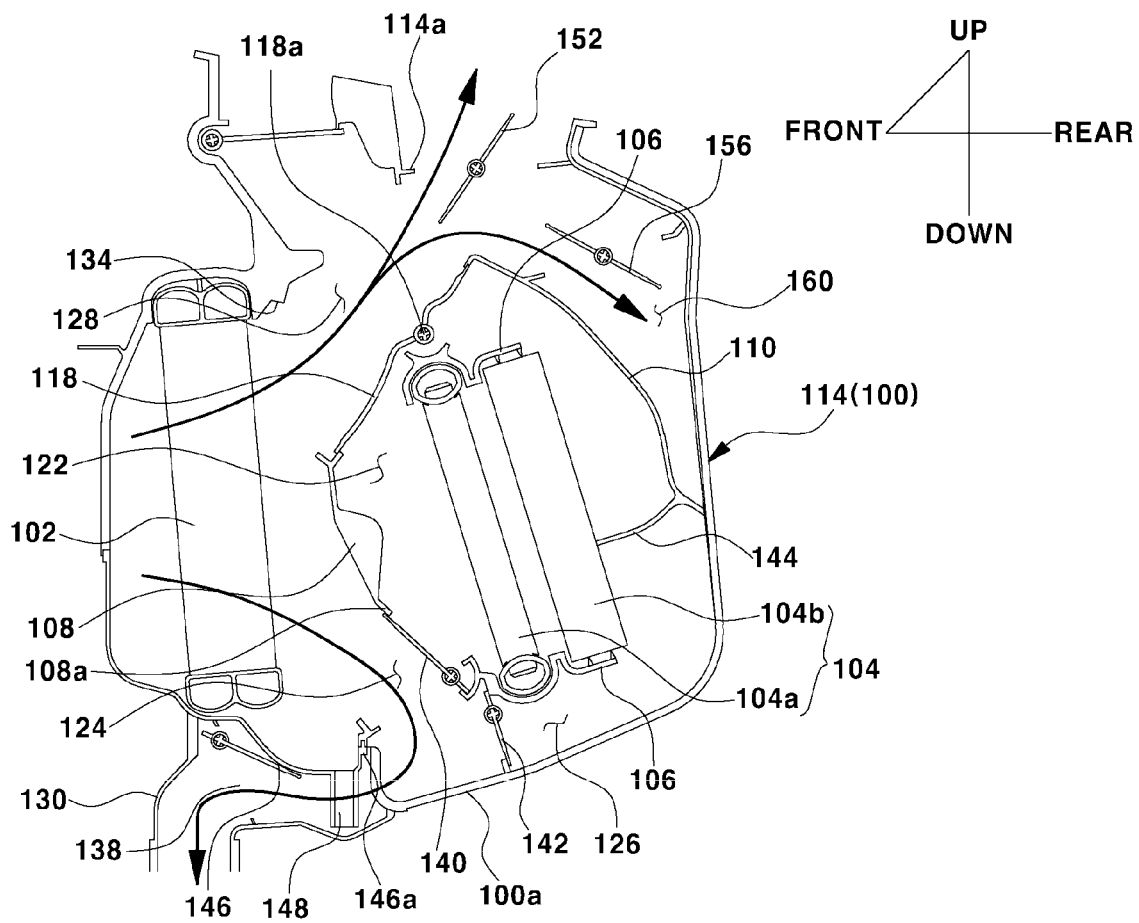
FIG. 6 is a view showing the casing when a left front temp door and a rear temp door are both operated in a closed mode.
Figure 7:
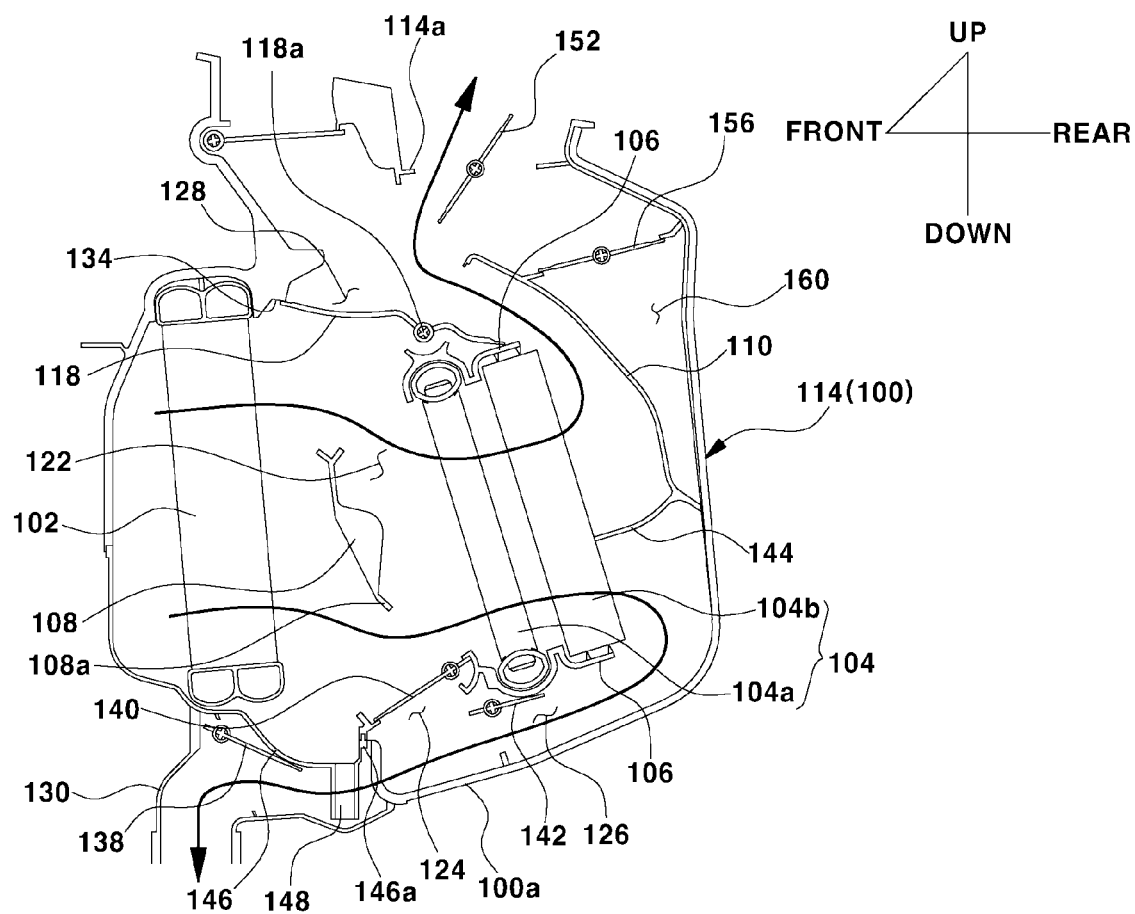
FIG. 7 is a view showing the casing when the left front temp door and the rear temp door are both operated in an open mode.

FIG. 6 shows the casing when the left front temp door 118 and the rear temp door 140 are both operated in a closed mode. FIG. 7 shows the casing when the left front temp door 118 and the rear temp door 140 are both operated in an open mode. The right front temp door 120 can be operated in the closed mode and the open mode in the same way as the left front temp door 118.

Referring to FIG. 7, when the left front temp door 118 is operated in the open mode, air that has passed through the cooler 102 can flow into a left region of the heating space 122. The air flowing in the heating space 122 can be heated through the left side of the heater 104.

Similar to the left front temp door 118 shown in FIG. 7, the right front temp door 120 can be operated in the open mode. When the right front temp door 120 is operated in the open mode, air decreased in temperature through the cooler 102 can flow into a right region of the heating space 122. The air flowing in the heating space 122 can be heated through the right side of the heater 104.

The air that has flowed in the casing 100 and has passed through the cooler may be blown to the interior of the vehicle without passing through the heater 104 (see FIG. 6) or may be discharged to the interior of the vehicle after passing through the heater 104 before being blown to the interior of the vehicle (see FIG. 7). The air that has passed through the cooler 102 can be blown to the front seat zone through the third channel 12, can pass through a third channel 128 and flow to the front seat zone when the left front temp door 118 is operated in the closed mode (see FIG. 6). The right front temp door 120 can be operated in the closed mode in the same way as the left front temp door 118 shown in FIG. 6. The air that has passed through the cooler 102 can be blown to the heating space 122, heated by the heater 104, and then discharged to the interior of the vehicle when the left front temp door 118 is operated in the open mode (see FIG. 7).

When the front temp doors 118 and 120 are operated in the open mode, the third channel 128 is closed and the upper portion of the heating space 122 is opened, so the air that has passed through the cooler 102 flows into the heating space 122. The third channel 128 may be a channel between the upper portion of the cooler 102 and the heating space 122. That is, the third channel 128 may be a channel positioned behind the upper portion of the cooler 102. The third channel 128 may be divided into a 3-1 channel at the left side (see 128 in FIG. 4A) and a 3-2 channel at the right side (see 128 in FIG. 4B) with the separator 112 therebetween.

When the front temp doors 118 and 120 are operated in the open mode, the front ends and the rear ends of the front temp doors 118 and 120 can come in contact with a supporting protrusion 134 and the upper portion of the mount 106, respectively. The supporting protrusion 134 protrudes from the inner side of the casing 100 and may be disposed behind the upper portion of the cooler 102.

Figure 8:
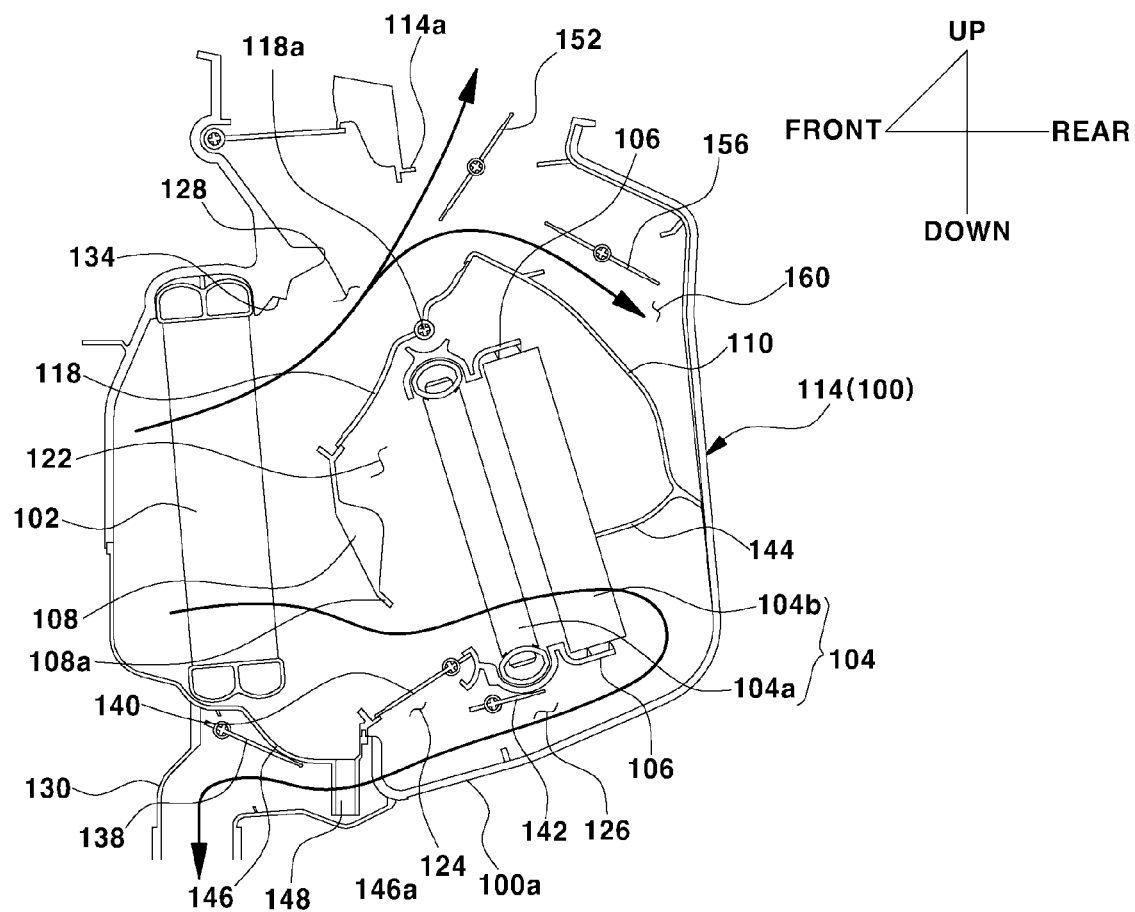
FIG. 8 is a view showing the casing when the left front temp door is operated in the closed mode and the rear temp door is operated in the open mode.
Figure 9:
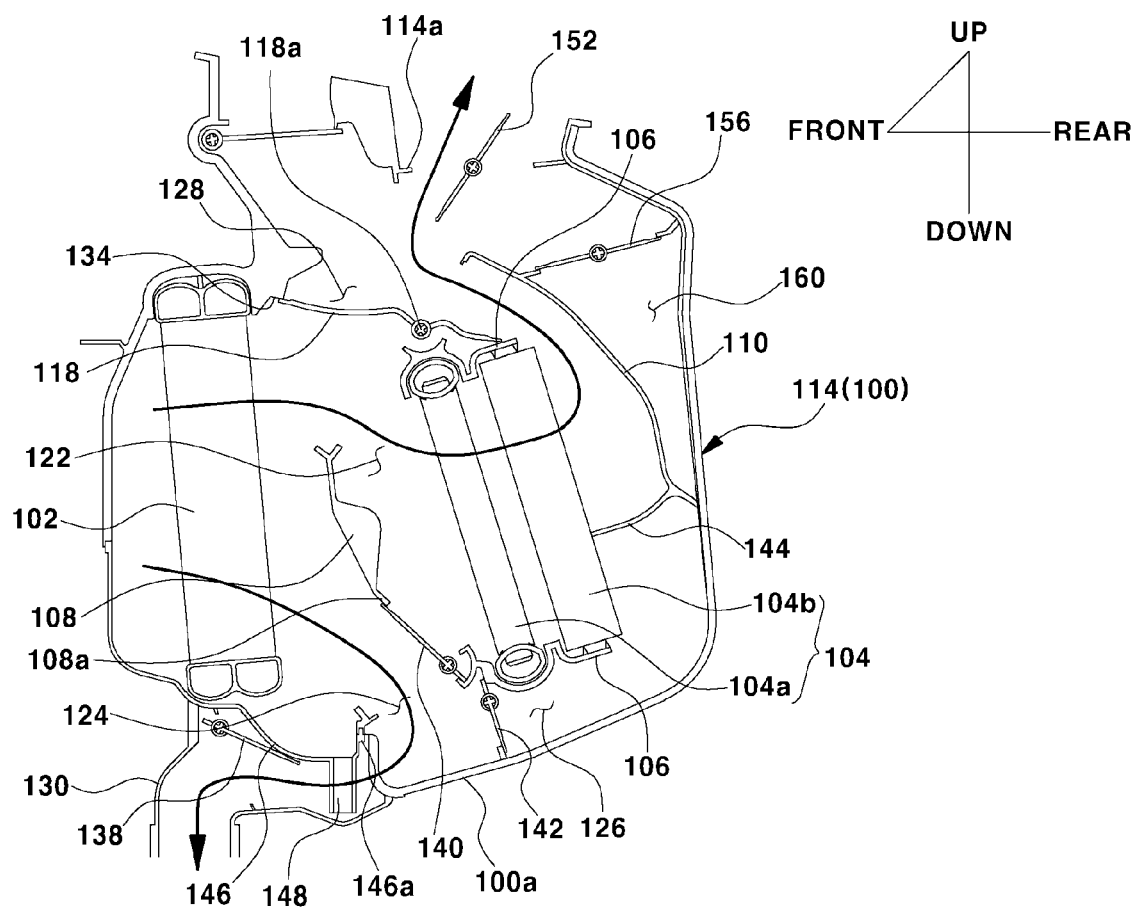
FIG. 9 is a view showing the casing when the left front temp door is operated in the open mode and the rear temp door is operated in the closed mode.

FIG. 8 shows the casing when the left front temp door 118 is operated in the closed mode and the rear temp door 140 is operated in the open mode. FIG. 9 shows the casing when the left front temp door 118 is operated in the open mode and the rear temp door 140 is operated in the closed mode.

Figure 10:
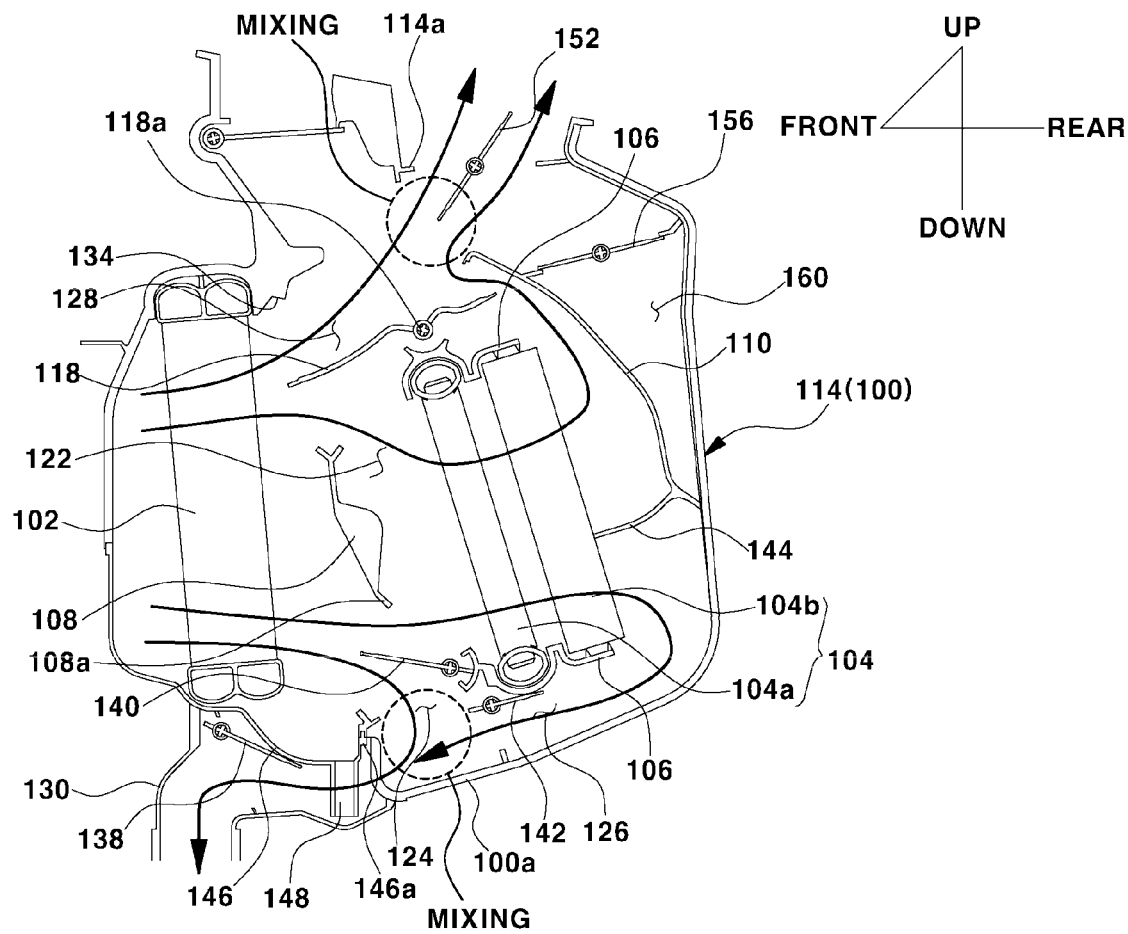
FIG. 10 is a view showing the casing when the left front temp door and the rear temp door are both operated in an intermediate mode.

FIG. 10 shows the casing when the left front temp door 118 and the rear temp door 140 are both operated in an intermediate mode. The right front temp door 120 can be operated in the intermediate mode in the same way as the left front temp door 118.

As shown in FIG. 10, when the left front temp door 118 is operated in the intermediate mode in which it is positioned between the position of the closed mode and the position of the open mode, that is, when the degree of opening of the left front temp door 118 is larger than 0% and smaller than 100%, some (i.e., first air) of the air that has passed through the cooler 102 can flow to a left front door 152 without passing through the heater 104, and the other (i.e., second air) of the air that has passed through the cooler 102 can flow to the left front door 152 after passing through the heater 104. The first air and the second air can be mixed in the casing 100 before they are discharged to the interior of the vehicle through the left front door 152. That is, the first air and the second air can be discharged to the interior of the vehicle after mixed together in the casing 100 (i.e., in a front mixing zone). The front mixing zone may be a space positioned at an upstream side of the front doors 152 and 154.

Since the operations of the left front temp door 118 and the right front temp door 120 are controlled in the way described above, it is possible to control the flow rate of the air that is blown to the heater 104 after passing through the cooler 102, and accordingly, it is possible to separately control the temperatures of the air that is discharged to the left front seat zone and the right front seat zone of the interior of the vehicle. To this end, the left front temp door 118 and the right front temp door 120 can be individually controlled. The temperature of the air that is blown to the left front seat zone can be controlled in accordance with the degree of opening of the left front temp door 118, and the temperature of the air that is blown to the right front seat zone can be controlled in accordance with the degree of opening of the right front temp door 120.

Referring to FIGS. 4A and 4B, the front separation wall 108 is disposed between the cooler 102 and the heater 104 to be able to inhibit or prevent the air that has passed through the cooler 102 from flowing to the heater 104. An inlet 108a through which the air that has passed through the cooler 102 can flow inside may be formed under the front separation wall 108, and rear temp door 140 that opens/closes the inlet 108a may be disposed. As shown in FIGS. 7 and 8, when the inlet 108a is opened by the rear temp door 140, the air that has passed through the cooler 102 can flow to the heater 104 through the inlet 108a. The rear temp door 140 can be rotatably supported at the lower portion of the casing 100.

The rear temp door 140 may be disposed with a predetermined gap under the front temp doors 118 and 120. The rear temp door 140 closes the inlet 108a of the front separation wall 108 when it is operated in the closed mode, and opens the inlet of the front separation wall 108 when it is operated in the open mode. As shown in FIG. 6, when the inlet 108a of the front separation wall 108 is closed, the air that has passed through the cooler 102 can be blown to the rear vent 130 through the first channel 124. As shown in FIG. 7, when the inlet 108a of the front separation wall 108 is open, the air that has passed through the cooler 102 can be blown to the heater 104 through the inlet 108a. The air blown to the heater 104 can be increased in temperature by the heater 104 and then can be blown to the rear vent 130 through the second channel 126.

The rear temp door 140 can inhibit or prevent the air that has passed through the cooler 102 from flowing to the rear vent 130 through the first channel 124 disposed between the lower end of the cooler 102 and the lower end of the heater 104 by closing the first channel 124 when opening the inlet 108a of the front separation wall 108. Further, the rear temp door 140 allows the air that has passed through the cooler 102 to flow to the rear vent 130 through the first channel 124 by opening the first channel 124 when closing the inlet of the front separation wall 108.

Further, when the rear temp door 140 is operated in the intermediate mode in which it is positioned between the position of the closed mode and the position of the open mode, that is, when the degree of opening of the rear temp door 140 is larger than 0% and smaller than 100%, as shown in FIG. 10, some (i.e., third air) of the air that has passed through the cooler 102 can flow to the rear vent 130 without passing through the heater 104, and the other (i.e., fourth air) of the air that has passed through the cooler 102 can flow to the rear vent 130 through the second channel 126 after passing through the heater 104.

The third air and the fourth air can be mixed in the casing 100 before they are discharged to the interior of the vehicle through the rear vent 130. That is, the third air and the fourth air can be discharged to the interior of the vehicle after mixed in the casing 100 (i.e., in a rear mixing zone). The rear mixing zone may be a space positioned at an upstream side of the rear vent 130.

Since the operation of the rear temp door 140 is controlled in the way described above, it is possible to control the flow rate of air that is blown to the heater 104 after passing through the cooler 102, and accordingly, it is possible to control the temperature of the air that is discharged to the rear seat zone of the interior of the vehicle. It is also possible to control the temperature of the air that is blown to the rear seat zone in accordance with the degree of opening of the rear temp door 140.

As shown in FIGS. 4A and 4B, the rear vent 130 for discharge air to the rear seat zone and a rear door 138 that opens/closes the rear vent 130 may be disposed at rear portion in the casing 100. The rear vent 130 may be disposed at the lower portion of the casing 100 to be positioned under the cooler 102 and the rear door 138 may be disposed in the rear vent 130 (i.e., a channel) to open/close the internal channel of the rear vent 130.

When the rear door 138 is operated in the closed mode, the air flowing to the rear vent 130 cannot be discharged to the rear seat zone. When the rear door 138 is operated in the open mode, the air flowing to the rear vent 130 can be discharged to the rear seat zone. For example, the air flowing to the rear vent 130 can be blown to the rear seat zone through a separate duct connected to the rear vent 130 outside the casing 100.

The flow rate of the air discharged from the rear vent 130 when the rear door 138 is operated in the intermediate mode, can be smaller than the flow rate of the air discharged from the rear vent 130 when the rear door 138 is operated in open mode. In other words, the flow rate of the air that is blown to the rear seat zone through the rear vent 130 can be controlled in accordance with the degree of opening of the rear door 138.

Further, the rear separation wall 110 may have a baffle 144. The baffle 144 may protrude from the front surface of the rear separation wall 110 toward the heater 104. The baffle 144 may extend up to the rear surface of the heater 104. As such, the baffle 144 may define an upper portion and a lower portion of the rear region of the heating space 122. The baffle 144 can guide the air that has passed through the inlet 108a of the front separation wall 108 to the second channel 126 through the lower portion of the heater 104. In other words, the baffle 144 can guide the air that has passed through the lower portion of the heater 104 to the second channel 126 by preventing the air from flowing to the upper portion of the heating space 122, whereby a flow rate of the air that is blown to the rear seat zone can be secured.

Further, a sub-rear temp door 142 may be disposed in the second channel 126. The sub-rear temp door 142 may be disposed in the casing 100 to be positioned under the front separation wall 108 and the mount 106. The sub-rear temp door 142 can rotate such that the lower portion thereof comes in contact with the bottom of the mount 106 when it is operated in the open mode. The sub-rear temp door 142 can open the second channel 126 when it is operated in the open mode. The sub-rear temp door 142 can rotate such that the lower portion thereof comes in contact with the bottom surface of the casing 100 when it is operated in the closed mode. The sub-rear temp door 142 can close the second channel 126 when it is operated in the closed mode. When sub-rear temp door 142 is operated in the closed mode, the air flowing to the rear vent 130 through the first channel 124 can be prevented from flowing backward to the upstream side of the second channel 126. That is, when sub-rear temp door 142 is operated in the closed mode, the air flowing to the rear vent 130 through the first channel 124 can be prevented from flowing backward to the opposite side to the rear vent 130 and the rear space in the casing 100. The sub-rear temp door 142 can guide the air flowing through the first channel 124 to the rear vent 130 when it is operated in the closed mode.

Figure 11:
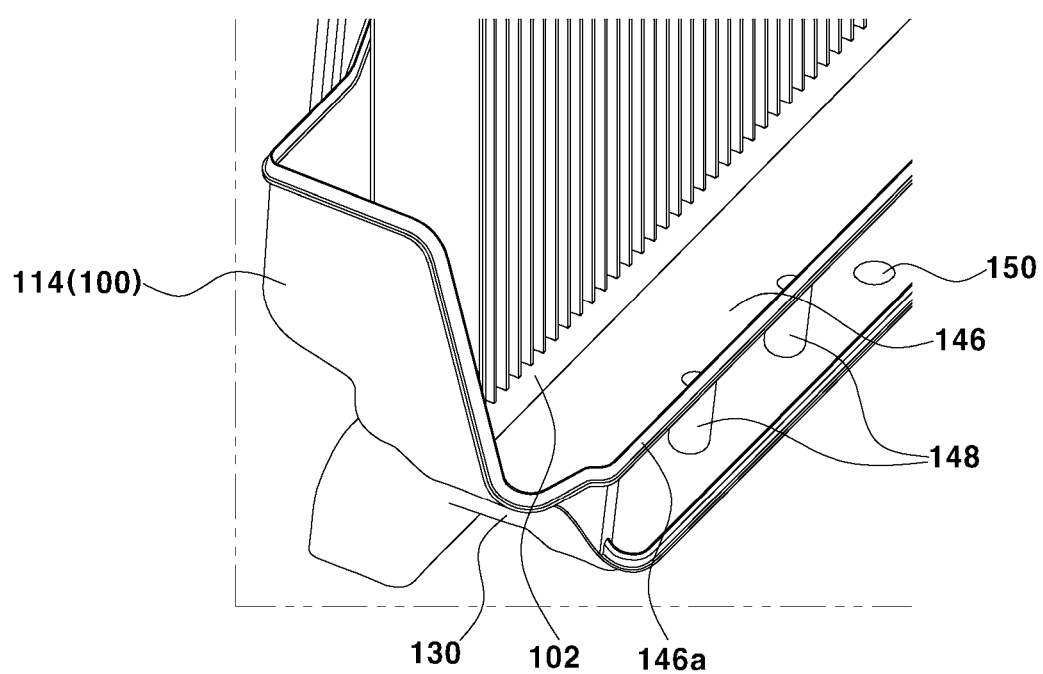
FIG. 11 is a view showing a drain for discharging condensate water.

Further, a condensate water collector 146 that collects condensate water produced by the cooler 102 may be disposed at the lower portion of the casing 100. The condensate water collector 146 may be disposed under the cooler 102 and over the rear vent 130. The condensate water collector 146 may have one or more discharge ports 148 for discharge the condensate water out of the casing 100. A rear side 146a of the condensate water collector 146 bends upward behind the discharge port 148, thereby being able to prevent the condensate water from overflowing out of the condensate water collector 146. The rear side 146a may be positioned lower than the lower end of the cooler 102 in the up-down direction of the vehicle. That is, the rear side 146a may be positioned under the lower end of the cooler 102. Referring to FIG. 11, when the condensate water collector 146 has two or more discharge ports 148, the discharge port 148 may be arranged left and right in the lower portion of the casing 100.

Referring to FIGS. 4A and 11, the discharge port 148 may be disposed in the rear vent 130, and a drain 150 for discharging condensate water out of the rear vent 130 may be disposed at a side of the rear vent 130. Condensate water can be discharged out of the vehicle through a drain hose, etc. connected to the drain 150.

The bottom surface 100a of the casing 100 surrounding the lower portion of the second channel 126 may be inclined upward and rearward from the front. In other words, the bottom surface 100a of the casing 100 disposed behind the condensate water collector 146 and under the first channel 124 may be inclined upward and rearward from the front. Accordingly, even if condensate water produced by the cooler 102 overflows the rear surface 146a of the condensate water collector 146 toward the second channel 126, the condensate water flows to the rear vent 130 by gravity, so it can be discharged to the drain 150.

Meanwhile, referring to FIGS. 4A and 4B, a left outlet 114a for sending air to the left front seat zone and a left front door 152 for opening/closing the left outlet 114a may be disposed at the upper portion of the left casing part 114. The left front door 152 can be rotated by an actuator and the flow rate of the air that is blown to the left front seat zone can be controlled in accordance with the degree of opening of the left front door 152.

Further, a right outlet 116a for discharging air to the right front seat zone and a right front door 154 for opening/closing the right outlet 116a may be disposed at the upper portion of the right casing part 116. The right front door 154 can be rotated by an actuator and the flow rate of the air that is blown to the right front seat zone can be controlled in accordance with the degree of opening of the right front door 154.

Further, other doors stated herein can also be rotated by actuators and the actuators for the doors can be individually controlled. Further, all of the doors stated herein can be rotatably supplied on the casing 100.

A first side door 156 may be disposed in the left casing part 114. The first side door 156 can form a left closed space 160 in the left casing part 114. The left closed space 160 can be closed by the rear surface and the sides of the left casing part 114, the rear separation wall 110, the separator 112, and the first side door 156. When the first side door 156 is operated in the open mode, the upper portion of the left closed space 160 can be opened. The air flowing in the left closed space can be discharged to the left front seat zone through a left front vent 164. The left front vent 164 may protrude from the outer surface of the left casing part 114.

Further, a second side door 158 may be disposed in the right casing part 116. The second side door 158 can form a right closed space 160 in the right casing part 116. The right closed space 162 can be closed by the rear surface and the sides of the right casing part 116, the rear separation wall 110, the separator 112, and the second side door 158. When the second side door 158 is operated in the open mode, the upper portion of the right closed space 162 can be opened. The air flowing in the right closed space 162 can be discharged to the right front seat zone through a right front vent 168. The right front vent 168 may protrude from the outer surface of the right casing part 116.

Although forms of the present disclosure were described above, the scope of the present disclosure is not limited to the forms, and various changes and modifications by those skilled in the art using the spirit of the present disclosure are also included in the scope of the present disclosure.

What is claimed is:

1. An air conditioner for a vehicle, comprising:
   a casing configured to accommodate a cooler and a heater, where the cooler is configured to decrease a temperature of air discharged to an interior of a vehicle, and the heater is configured to increase the temperature of the air discharged to the interior of the vehicle;
   a front temp door disposed in the casing and configured to control a temperature of air that is supplied to a front seat zone of the interior of the vehicle by controlling a flow rate of air flowing to the heater after passing through the cooler;
   a rear temp door disposed under the front temp door and configured to control a temperature of air that is supplied to a rear seat zone of the interior of the vehicle by controlling the flow rate of the air flowing to the heater after passing through the cooler; and
   a rear vent disposed at a lower portion of the casing under the cooler, wherein the cooler is disposed ahead of the heater and the rear vent is configured to discharge air to the rear seat zone,
   wherein a front separation wall configured to inhibit the air that has passed through the cooler from flowing to the heater is disposed between the cooler and the heater, and the front separation wall has an inlet that is opened and closed by the rear temp door, wherein when the inlet of the front separation wall is opened by the rear temp door, the air that has passed through the cooler flows to the heater through the inlet, wherein the rear temp door is configured to inhibit the air that has passed through the cooler from flowing to the rear vent through a first channel disposed between a lower end of the cooler and a lower end of the heater by closing the first channel when the inlet of the front separation wall is opened, wherein a second channel configured to guide air that has passed through the heater to the rear seat zone is disposed under the heater, and the rear vent is disposed at a downstream side of the first channel and the second channel, and in response to the rear temp door operated in an intermediate mode in which the rear temp door is positioned between a position of a closed mode and a position of an open mode, some of the air that has passed through the cooler flow to the rear vent without passing through the heater, and the rest of the air that has passed through the cooler flow to the rear vent through the second channel after passing through the heater.

2. The air conditioner of claim 1, wherein a rear door configured to open and close the rear vent is disposed at the lower portion of the casing, and a flow rate of the air blown to the rear seat zone through the rear vent is controlled based on a degree of opening of the rear door.

3. The air conditioner of claim 1, wherein the front separation wall is disposed ahead of the heater, a rear separation wall is disposed behind the heater, and an upper portion of a heating space surrounded by the front separation wall and the rear separation wall is opened and closed by a left front temp door and a right front temp door.

4. The air conditioner of claim 3, wherein the rear separation wall has a baffle protruding toward the heater, and the baffle is configured to guide air, which has passed through a lower portion of the heater after passing through the inlet of the front separation wall, to the second channel.

5. The air conditioner of claim 1, wherein a sub-rear temp door configured to inhibit air that has passed through the first channel from flowing backward to an upstream side of the second channel is disposed in the second channel.

6. The air conditioner of claim 1, wherein the casing has a condensate water collector disposed under the cooler, the condensate water collector has a discharge port configured to discharge condensate water produced by the cooler, and a rear surface of the condensate water collector bends upward behind the discharge port.

7. The air conditioner of claim 6, wherein the rear surface of the condensate water collector is positioned under a lower end of the cooler.

8. The air conditioner of claim 7, wherein a bottom surface of the casing disposed behind the condensate water collector and under the first channel is inclined upward and rearward from a front.

9. The air conditioner of claim 1, wherein a left outlet configured to discharge air to a left front seat zone and a left front door configured to open and close the left outlet are disposed at an upper portion of a left casing part, and a flow rate of air that is blown to the left front seat zone is controlled based on a degree of opening of the left front door.

10. The air conditioner of claim 1, wherein a right outlet configured to discharge air to a right front seat zone and a right front door configured to open and close the right outlet are disposed at an upper portion of a right casing part, and a flow rate of air that is blown to the right front seat zone is controlled based on a degree of opening of the right front door.

11. The air conditioner of claim 1, wherein the casing is divided into a left casing part and a right casing part by a separator disposed at a center portion of the casing.

12. The air conditioner of claim 11, wherein the front temp door includes:

a left front temp door disposed in the left casing part and configured to control a temperature of air that is supplied to a left front seat zone of the interior of the vehicle by controlling a flow rate of the air flowing to the heater after passing through the cooler; and a right front temp door disposed in the right casing part and configured to control a temperature of air that is blown to a right front seat zone of the interior of the vehicle by controlling the flow rate of the air flowing to the heater after passing through the cooler.

* * * * *